United States Patent
Leydier et al.

(10) Patent No.: US 7,656,979 B2
(45) Date of Patent: Feb. 2, 2010

(54) DATA COMMUNICATION DEVICE

(75) Inventors: Robert Leydier, Montrouge (FR); Alain Pomet, Grenoble (FR)

(73) Assignees: Axalto S.A., Meudon Cedex (FR); STMicroelectronics SA, Montrouge (FR)

( * ) Notice: Subject to any disclaimer, the term of this patent is extended or adjusted under 35 U.S.C. 154(b) by 582 days.

(21) Appl. No.: 11/325,233

(22) Filed: Jan. 4, 2006

(65) Prior Publication Data
US 2006/0146968 A1 Jul. 6, 2006

(30) Foreign Application Priority Data
Jan. 5, 2005 (EP) .................................. 05290013

(51) Int. Cl.
*H04L 7/00* (2006.01)

(52) U.S. Cl. ........................ 375/354; 375/359
(58) Field of Classification Search .......... 375/354–359
See application file for complete search history.

(56) References Cited

U.S. PATENT DOCUMENTS 5,588,025 A * 12/1996 Strolle et al. ................ 375/316
5,815,017 A   9/1998 McFarland
6,064,707 A   5/2000 Woodman, Jr.
2002/0097805 A1 * 7/2002 Casper et al. ............... 375/257
2004/0081053 A1 * 4/2004 Kojima ..................... 369/59.11
2004/0148539 A1   7/2004 Leydier et al.
2006/0045215 A1 * 3/2006 Ballantyne et al. .......... 375/344

OTHER PUBLICATIONS

European Patent Office Communication dated Jun. 3, 2005 (5 pages).

* cited by examiner

*Primary Examiner*—Emmanuel Bayard
(74) *Attorney, Agent, or Firm*—Osha • Liang LLP

(57) ABSTRACT

A data communication device comprises an input circuit (DRTC) that converts external data (XDT) into internal data (IDT) on the basis of a sampling signal (SP). A synchronization circuit (SYNC) provides the sampling signal (SP) on the basis of an oscillator signal (OS) and a synchronization value (SV). The synchronization value (SV) is representative of a number of cycles of the oscillator signal (OS) contained within a time interval for a unit of external data. The synchronization value (SV) is an initial value (IV) during an initial synchronization phase and a measured value (MV) during a measurement-based synchronization phase. A control circuit (IFC) carries out a calibration step in which the initial value (IV) is a preprogrammed reset value (RV) and in which the measured value (MV) is stored as a calibration value (CV). The control circuit (IFC) applies the calibration value (CV) as the initial value (IV) in subsequent initial synchronization phases.

8 Claims, 4 Drawing Sheets

DATA COMMUNICATION DEVICE

BACKGROUND OF INVENTION

An aspect of the invention relates to a data communication device. The data communication device may be, for example, a device that communicates data in accordance with a universal serial bus (USB) standard. Other aspects of the invention relate to a method of manufacturing such a data communication device, a method of data communication, a computer program product, and a data processing system. The data processing system may comprise, for example, a desktop or laptop computer and a security device that exchange data in accordance with the USB standard. The security device may be in the form of, for example, a smartcard in accordance with the ISO7816-12 standard or a token that can be coupled to a USB port of the computer.

United States patent application published under No. 2004/0148539 describes a device that generates a local clock period from a USB downstream-received bit-serial signal. The device does not require the use of a crystal or resonator. Counters are used to determine a first number of periods of a free-running high-frequency clock signal contained within a known number of bit periods of the downstream-received bit-serial signal. The first number of periods is divided by the known number of bit periods of the received bit-serial signal to determine a second number of periods of the free-running high-frequency clock signal comprised in a single bit period of the received bit-serial signal. The local clock period is generated on the basis of the free-running high-frequency clock signal and the second number of periods. The local clock period may be phase-locked with the received bit serial signal. The local period is updated on an ongoing manner by downstream known received traffic.

SUMMARY OF INVENTION

According to an aspect of the invention, a data communication device has the following characteristics. A data communication device comprises an input circuit that converts external data into internal data on the basis of a sampling signal. A synchronization circuit provides the sampling signal on the basis of an oscillator signal and a synchronization value. The synchronization value is representative of a number of cycles of the oscillator signal contained within a time interval for a unit of external data. The synchronization value is an initial value during an initial synchronization phase and a measured value during a measurement-based synchronization phase. A control circuit carries out a calibration step in which the initial value is a preprogrammed reset value and in which the measured value is stored as a calibration value. The control circuit applies the calibration value as the initial value in subsequent initial synchronization phases.

The invention takes the following aspects into consideration. Reliability and robustness of data communication with a device of the subject type substantially depends on the precision of the sampling signal in terms of time and frequency. In many applications, the external data comprises a sequence of data units, such as, for example, bits, wherein each data unit occurs within a particular time interval. Ideally, the sampling signal should cause the input circuit to decide upon the value of the relevant data unit in the middle of that time interval. In that case, data communication artifacts such as interference or jitter have the least influence.

In the prior-art device, the sampling signal, which is referred to as local clock period, is generated on the basis of a stable but relatively imprecise free-running oscillator. Nevertheless, the local clock period can be relatively precise by counting the number of free-running oscillator cycles in a predefined pattern of N bits, N being an integer. Accordingly, a one-bit period is defined with relatively great precision in terms of the counted number of free-running oscillator cycles divided by N. The free-running oscillator cycles are first counted during an initial synchronization phase after a power-up sequence. In that phase, an initial value determines the respective instances when the external data is sampled. The initial value is a preprogrammed fixed value, which represents a nominal number of free-running oscillator cycles in a one-bit period. Since the free-running oscillator cycles are relatively imprecise, the sampling during the initial synchronization phase is relatively imprecise too. This may jeopardize a correct count of the number of free-running oscillator cycles, which prevents any further synchronization. In that case, data communication will be unreliable or even impossible.

In accordance with the aforementioned aspect of the invention, a control circuit carries out a calibration step in which the initial value is a preprogrammed reset value and in which the measured value, which is a clock cycle count, is stored as a calibration value. The control circuit applies the calibration value as the initial value in subsequent initial synchronization phases.

Accordingly, the preprogrammed reset value needs to be used only during the initial synchronization phase within the calibration step. The calibration step can be carried out under controlled conditions at, for example, a manufacturing site or another site before customer delivery. Once the calibration step has been carried out, subsequent synchronization phases will use the calibration value, which is based on a measured value, a count of oscillator cycles. The calibration value compensates for oscillator-frequency imprecision due to production spread, which may be significant in particular in integrated circuit implementations. Since the calibration value is used as the initial value in subsequent initial synchronization phases, which will occur at a customer end, the sampling signal will be more precise during those phases. Moreover, the synchronization circuit needs to compensate for temperature variations and aging only, because production spread has already been accounted for by the calibration value. Consequently, there is a significant higher probability that successful synchronization will be achieved for a particular data communication session at the customer end. For those reasons, the invention allows a more robust and reliable data communication.

These and other aspects of the invention will be described in greater detail hereinafter with reference to drawings.

DETAILED DESCRIPTION

Figure 1:
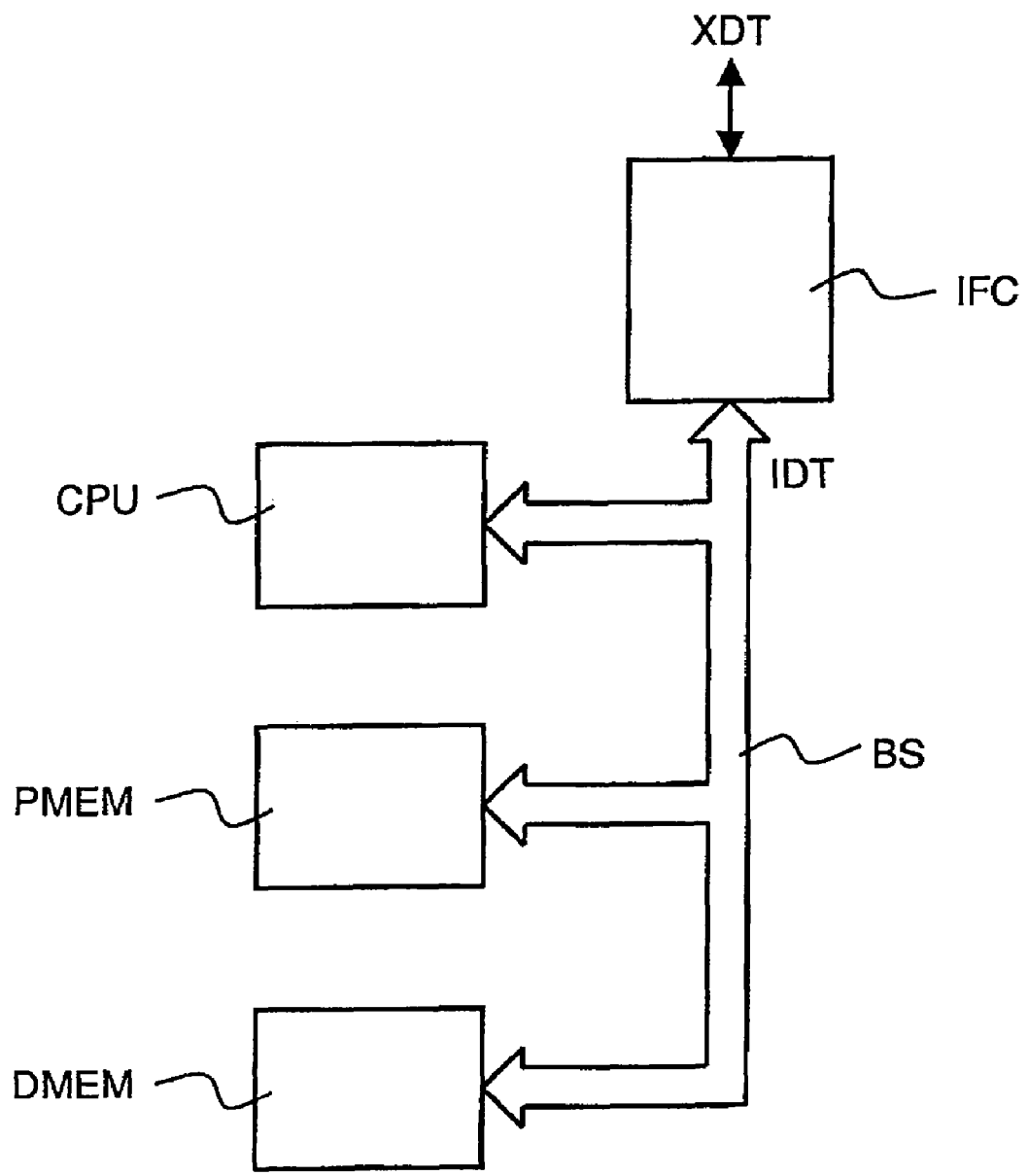
FIG. 1 is a block diagram that illustrates a universal serial bus device.

FIG. 1 illustrates a universal serial bus device USBDV. The universal serial bus device USBDV comprises an interface circuit IFC, a central processing unit CPU, a program memory PMEM, a data memory DMEM, and a bus BS. The bus BS constitutes a path via which the aforementioned elements may exchange data, including control data.

The universal serial bus device USBDV carries out various different operations, such as, for example, an authentication on the basis of electronic keys. The program memory PMEM comprises a set of instructions, i.e. software, which causes the central processing unit CPU to effect these various different operations. The data memory DMEM stores intermediate results of the operations. An operation may be defined by a software module, such as, for example, a subroutine. The program memory PMEM also comprises software for carrying out internal control functions to ensure a suitable operation of the universal serial bus device USBDV.

The interface circuit IFC converts external data XDT into internal data IDT, and vice versa. The external data XDT and the internal data IDT have substantially different formats. The external data XDT has a format that is in accordance with a universal serial bus standard. Accordingly, the external data XDT may be a serial bitstream represented by means of a differential signal having a so-called DM component and a so-called DP component. Alternatively, a single-ended signal may also represent the external data XDT. The external data XDT that the interface circuit IFC receives is synchronous with a clock signal, which is generated at a transmission end with relatively great precision. Consequently, each bit in the external data XDT has a precise duration.

Moreover, the external data XDT comprises predefined bit patterns for the purpose of synchronization and signaling. In a reception mode, which corresponds to a so-called downstream traffic, the interface circuit IFC recognizes those predefined bit patterns and takes appropriate action in response thereto. Conversely, in a transmission mode, which corresponds to a so-called upstream traffic, the interface circuit IFC generates the required predefined bit patterns for the purpose of synchronization and signaling.

The internal data IDT has a format that is commonly used in data transmission via an internal bus BS. Respective bits of binary value are transmitted in parallel rather than in series and at a rate that is generally different.

Figure 2:
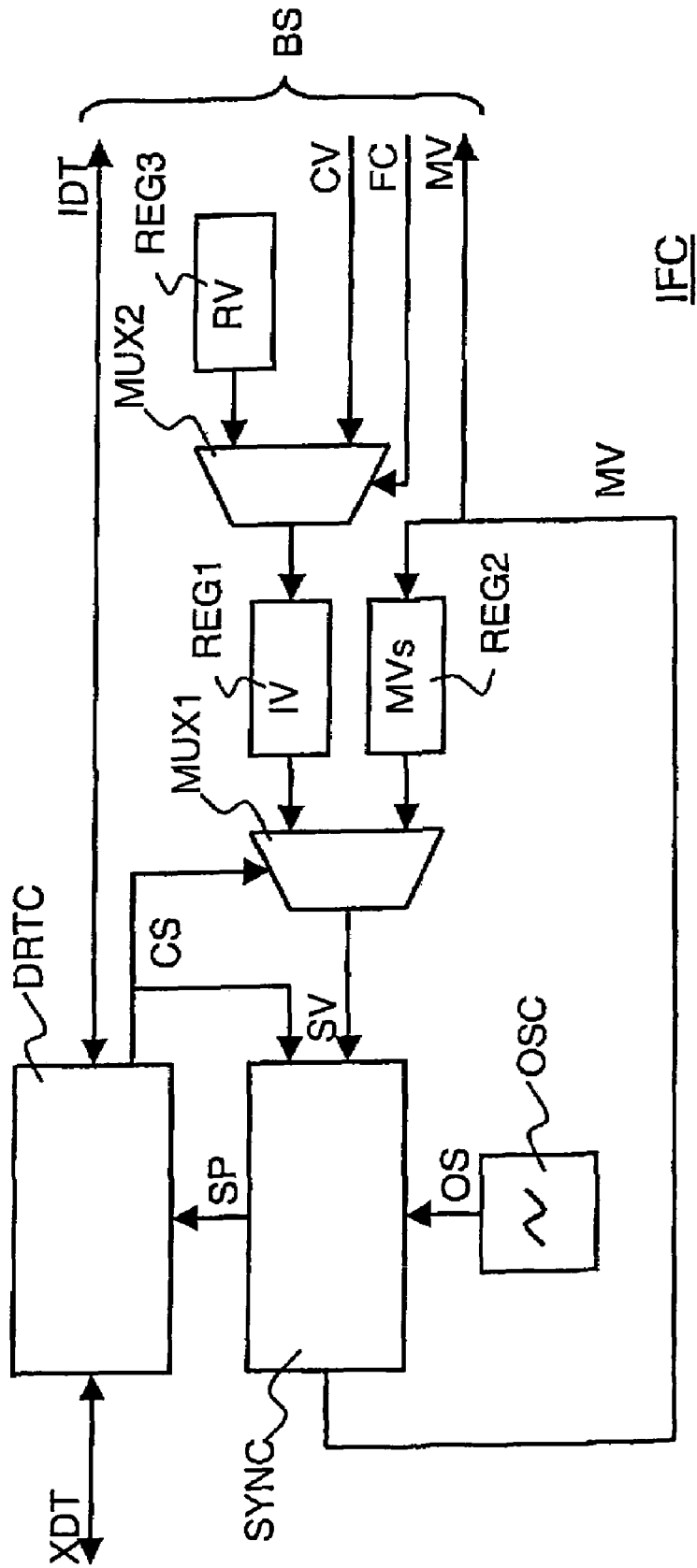
FIG. 2 is a block diagram that illustrates an interface circuit that forms part of the universal serial bus device.

FIG. 2 illustrates the interface circuit IFC. The interface circuit IFC comprises a data reception-and-transmission circuit DRTC, a synchronization circuit SYNC, an oscillator circuit OSC, two multiplexers MUX1, MUX2, and three registers REG1, REG2, REG3. The data reception-and-transmission circuit DRTC detects the aforementioned predefined bit patterns that are comprised in the external data XDT received. In response thereto, the data reception-and-transmission circuit DRTC provides control signals CS for multiplexer MUX1 and the synchronization circuit SYNC.

The oscillator circuit OSC provides a set of multiphase oscillator signals OS in which each oscillator signal has a different phase. The different phases may be, for example, 0°, 45°, 90°, 135°, 180°, 225°, 270° and 315°. The oscillator circuit OSC may be, for example, similar to the free-running oscillator circuit described in US patent application published under No. 2004/0148539. FIG. 10 of that patent publication illustrates the free-running oscillator circuit. The oscillator OSC may be implemented in the form of, for example, a CMOS integrated circuit. In that case, the set of multiphase oscillator signals OS will have a precision that is characterized by the following items:

Short-term stability of ±0.01%, over a few milliseconds;
Production spread of ±20%, chip-to-chip, wafer-to-wafer, foundry to foundry;
Thermal drift of ±3% over 60° C.;
Packaging influence of ±1%; and
Aging of ±1%.

The synchronization circuit SYNC generates a sampling signal SP on the basis of the set of multiphase oscillator signals OS, the control signals CS, and a synchronization value SV. The data reception-and-transmission circuit DRTC samples the external data XDT received on the basis of the sampling signal SP. This sampling constitutes an important step in conversion of external data XDT into internal data IDT. The sampling signal SP may comprise, for example, sampling edges. Preferably, each sampling edge substantially occurs at the middle of a bit period. The closer the sampling edge is to the middle of the bit period, the more reliable and robust data reception will be. The synchronization value SV determines the position of the sampling edge within a bit period in terms of number of cycles within the set of multiphase oscillator signals OS.

The synchronization value SV can be a reset value RV, which is stored in register REG3, a calibration value CV, which is stored in a nonvolatile location of the data memory DMEM, or a stored measured value MVs, which is stored in register REG2. Multiplexer MUX2 receives the reset value RV, which is stored in register REG3. Register REG3 may be a so-called wired register that contains a fixed value, which is functionally equivalent to a read-only memory. Multiplexer MUX2 further receives the calibration value CV, which is stored in a nonvolatile location of the data memory DMEM. Multiplexer MUX2 either transmits the reset value RV or the calibration value CV depending on a calibration flag FC that is stored in a non-volatile location of the data memory DMEM. The transmitted value, which is either the reset value RV or the calibration value CV, is stored in register REG1.

The value that is stored in register REG1 constitutes an initial value IV. Multiplexer MUX1 receives the initial value IV and the stored measured value MVs, which is present in register REG2. The stored measured value MVs is a measured value MV that the synchronization circuit SYNC has established and that has been stored in register REG2. The measured value MV may also be transferred to a nonvolatile memory location of the data memory DMEM via the bus BS. Multiplexer MUX1 either applies the initial value IV or the stored measured value MVs to the synchronization circuit SYNC depending on the control signals CS from the data reception-and-transmission circuit DRTC.

Figure 3A:
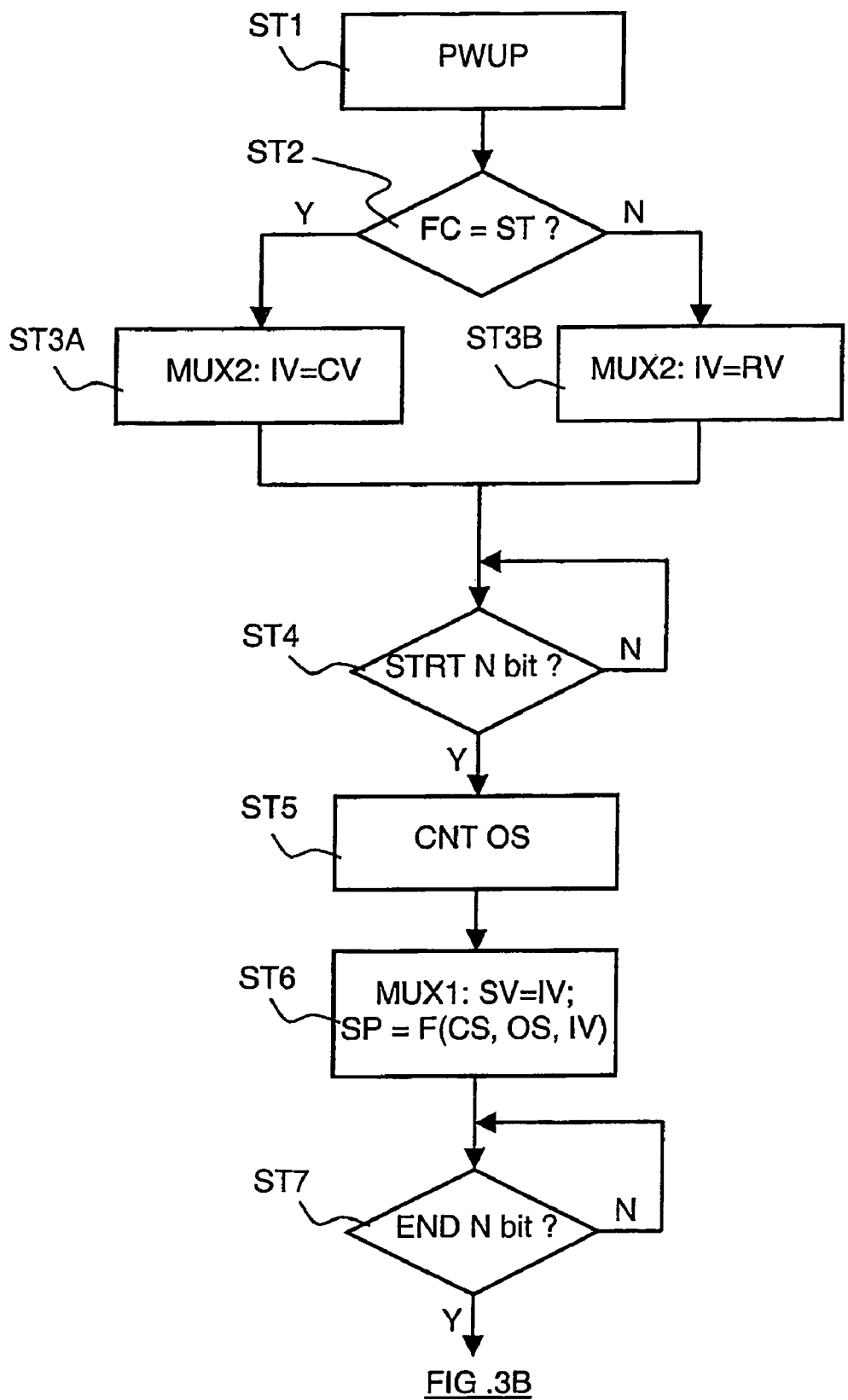
FIGS. 3A and 3B are flowchart diagrams that illustrate operations that the universal serial bus device carries out.
Figure 3B:
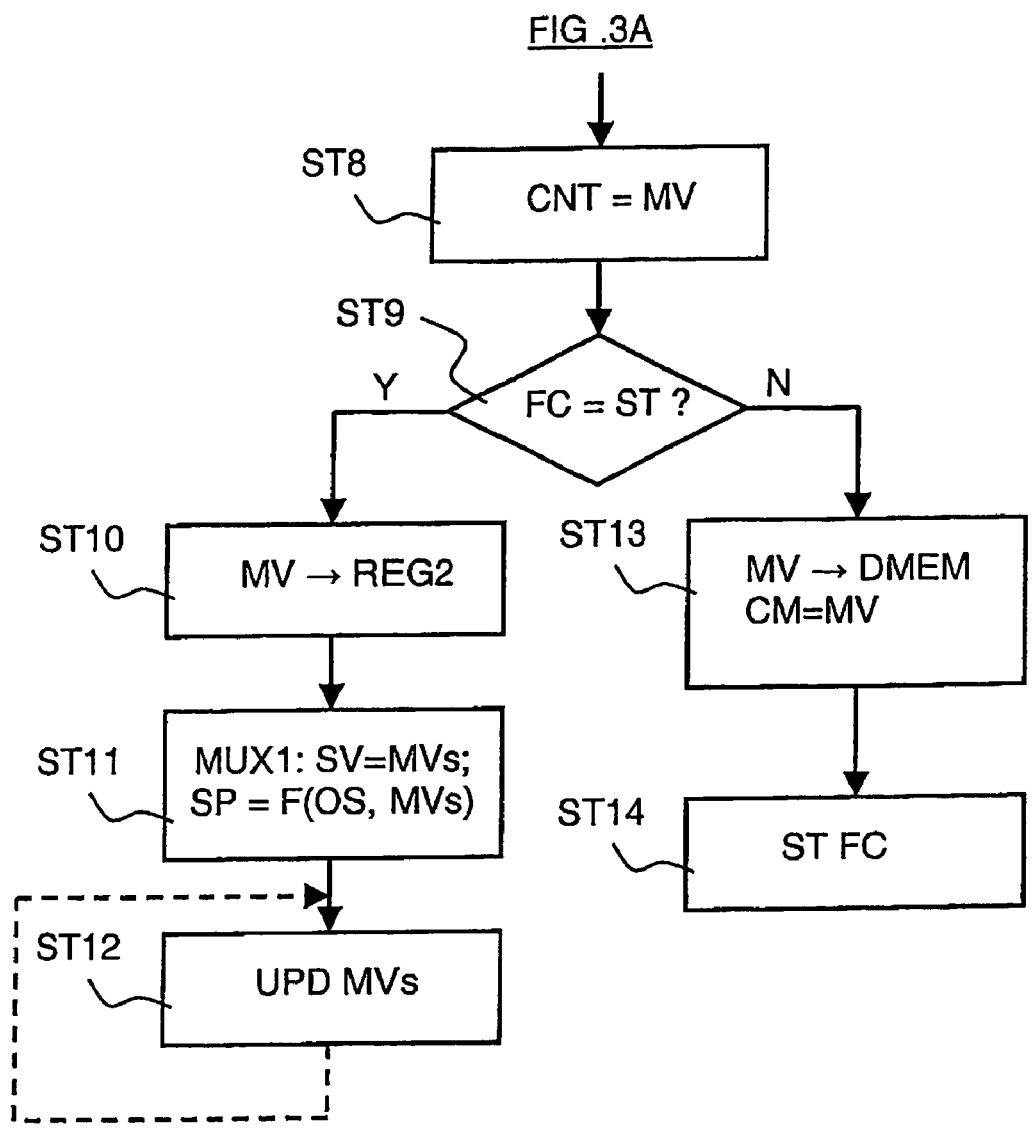

FIGS. 3A and 3B further illustrate the operation of the universal serial bus device USBDV, which is illustrated in FIG. 1, and the interface circuit IFC that forms part thereof and which has been illustrated in FIG. 2. FIG. 3A illustrates a first series of steps. FIG. 3B illustrates a subsequent series of steps.

In a first step ST1, the universal serial bus device USBDV, which is illustrated in FIG. 1, is coupled to a universal serial bus host. This initiates a so-called power up phase in which mutual recognition takes place (PWUP). In a second step ST2, it is checked whether a calibration flag FC has been set or not (FC=ST?). The universal serial bus device USBDV carries out a first-alternative third step ST3A if the calibration flag FC has been set. In this step, the calibration value CV is read from the data memory DMEM, which is illustrated in FIG. 1, and stored in register REG1 as the initial value IV via multiplexer MUX2, which is illustrated in FIG. 2 (MUX2: IV=CV). The universal serial bus device USBDV carries out a second-alternative third step ST3B if the calibration flag FC has not been set. In this step, the reset value RV is read from register REG3 and stored in register REG2 as the initial value IV via multiplexer MUX2 (MUX2: IV=RV).

In a fourth step ST4, the data reception-and-transmission circuit DRTC, which is illustrated in FIG. 2, checks whether a predefined bit pattern has started or not (STRT N bit ?). It is assumed that the predefined bit pattern comprises N bits, N being an integer value, such as, for example, 4 or 8. The fourth step ST4 may be implemented in the form of, for example, a detection circuit specifically arranged to detect one or more predefined bit patterns. The control signals CS, which are illustrated in FIG. 2, signal the start of a predefined bit pattern. In a Low Speed, the predefined bit pattern may be, for example, a Synchronization Packet followed by the Packet Identifier within which there is an even number of bits (4 or 8). In a Full Speed, the predefined bit pattern may comprise two consecutives Start Of Frame (SOF) marks within which there are typically 12,000 bits.

The universal serial bus device USBDV carries out a fifth step ST5, a sixth step ST6, and a seventh step ST7, if the data reception-and-transmission circuit DRTC has detected the predefined bit pattern. In the fifth step ST5, the synchronization circuit SYNC counts cycles of an oscillator signal comprised in the set of multiphase oscillator signals OS that the oscillator circuit OSC provides (CNT OS). To that end, the synchronization circuit SYNC may comprise a dedicated counter. In the sixth step ST6, the synchronization circuit SYNC generates the sampling signal SP on the basis of the control signals CS, the set of multiphase oscillator signals OS, and the initial value IV, which constitutes the synchronization value SV (MUX1: SV=IV; SP=F(CS, OS, IV)).

The synchronization circuit SYNC generates the sampling signal SP in the following manner. The control signals CS signal the start of a bit period. The synchronization circuit SYNC counts the number of cycles of an oscillator signal comprised in a set of multiphase oscillator signals OS. The synchronization circuit SYNC provides a sampling edge when the number of cycles corresponds to the initial value IV. Accordingly, the position of the sampling edge within the bit period concerned is a function of the frequency of the oscillator signal and the initial value IV. The frequency of the oscillator signal may be relatively imprecise. The frequency may have any value in a relatively wide frequency range, for example, between 33 and 66 MHz. The initial value IV should preferably compensate this imprecision to a certain extent.

In the seventh step ST7, the data reception-and-transmission circuit DRTC checks whether the predefined bit period has ended or not (END N bit ?). The seventh step ST7 may be implemented in the form of, for example, the detection circuit mentioned hereinbefore with respect to the fourth step ST4. The control signals CS, which are illustrated in FIG. 2, signal the end of the predefined bit pattern.

Accordingly, the fifth step ST5, the sixth step ST6, and the seventh step ST7 constitute a loop. The loop has a duration that corresponds to N bits periods. The loop is entered into at the fourth step ST4 when the predefined bit pattern starts. The loop is left at the seventh step ST7 when the predefined bit pattern ends. The synchronization circuit SYNC counts the number of cycles of the oscillator signal during the loop in the fifth step ST5. Accordingly, the number of cycles at the end of the loop corresponds to N bits period.

In an eighth step ST8, which is illustrated in FIG. 3B, the synchronization circuit SYNC determines how many cycles of the oscillator signal are comprised in a one-bit period. It is sufficient to divide the number of cycles counted hereinbefore by N, which is the number of bits comprised in the predefined bit pattern. The number of cycles comprised in a one-bit period constitutes the measured value (CNT=MV). The measured value need not necessarily be an integer value. The measured value may have an integer portion and a fractional portion. The fractional portion may be expressed in units of ⅛ of the period of the oscillator signal. For example, the measured value may be 33⅝, 33 being the integer portion and ⅝ being the fractional portion.

In a ninth step ST9, the universal serial bus device USBDV checks anew whether the calibration flag FC has been set or not, similar to the second step ST2 (FC=ST ?). The universal serial bus device USBDV carries out a tenth step ST10, an eleventh step ST11, and a twelfth step ST12, if the calibration flag FC has been set. In the tenth step ST 10, the measured value MV is stored into register REG2 so as to become the stored measured value MVs (MV→REG2). In the eleventh step ST11, the synchronization circuit SYNC generates the sampling signal SP on the basis of the set of multiphase oscillator signals OS and the stored measured value MVs (MUX1: SV=MVs; SP=F(OS, MVs). The sampling signal SP is a periodic signal having a frequency that corresponds to the frequency of the set of multiphase oscillator signals OS divided by the measured value MV.

It is recalled that the measured value MV may have a fractional portion. The synchronization circuit SYNC takes into account the fractional portion by selecting an oscillator signal that has an appropriate phase among the set of multiphase oscillator signals OS. It is thus possible to simulate a higher oscillator frequency, which allows greater precision. For example, let it be assumed that the set of multiphase oscillator signals OS have a frequency of 50 MHz and that the measured value MV is 33⅝. In that case, the sampling signal SP that the synchronization circuit SYNC generates will have a period that is equal to 20 nanoseconds (ns) multiplied with 33⅝, which corresponds to 672.5 ns. The period of the sampling signal SP can thus be adjusted with a granularity of 20/8=0.25 ns, which corresponds to a cycle of a 400 MHz clock signal.

In the twelfth step ST12, the universal serial bus device USBDV continues to calculate further measured values on the occurrence of subsequent predefined bit patterns. A newly calculated measured value MV will replace the stored measured value MVs in register REG2 (UPD MVs). Accordingly, the stored measured value MVs is continuously updated on the basis of the downstream traffic. This allows compensating for thermal drifts and aging, which contributes to a reliable and robust data communication. In that respect, it should be noted that the continuous update of the stored measured value MVS allows a correction of rounding errors. For example, let it be assumed that the stored measured value MVs should ideally be 33.600 but that the stored measured value MVs can be expressed in $\frac{1}{8}^{th}$ units only. In that case, the stored measured value MVs is set to be 33⅝ for 4 consecutive time intervals and 33½ for 1 subsequent time interval.

Returning to the ninth step ST9, the universal serial bus device USBDV carries out a thirteenth step ST13 and a fourteenth step ST14 if the calibration flag FC has not been set. In the thirteenth step ST13, the universal serial bus device USBDV stores the measured value MV, which has been calculated in the preceding steps, in a nonvolatile location of the data memory DMEM, which is illustrated in FIG. 1 (MV→DMEM). This storage causes the measured value to be the calibration value CV (CM=MV), which will be available as such at the occurrence of a subsequent power up phase. In the fourteenth step ST14, the universal serial bus device USBDV sets the calibration flag FC (ST FC) so that the initial value IV will be the calibration value CV hereinafter.

The universal serial bus device USBDV described hereinbefore is preferably manufactured in the following manner. In a device manufacturing step, the universal serial bus device USBDV is manufactured in the form of, for example, an integrated circuit. The calibration flag FC, which is present in the data memory DMEM, is not set. In a finishing manufacturing step, external data XDT is applied to the universal serial bus device USBDV. The finishing manufacturing step will cause the universal serial bus device USBDV to establish a measured value that will be the calibration value CV in subsequent operations at the customer end. Accordingly, the imprecision of the oscillator circuit OSC is compensated for on shipped products.

CONCLUDING REMARKS

The detailed description hereinbefore with reference to the drawings illustrates the following characteristics. A data communication device (USBDV) comprises an input circuit (data reception-and-transmission circuit DRTC) that converts external data (XDT) into internal data (IDT) on the basis of a sampling signal (SP). A synchronization circuit (SYNC) provides the sampling signal (SP) on the basis of an oscillator signal (set of multiphase oscillator signals OS) and a synchronization value (SV). The synchronization value (SV) is representative of a number of cycles of the oscillator signal contained within a time interval for a unit of external data (a bit constitutes a unit of data, SV represents the number of cycles in a one-bit period). The synchronization value (SV) is an initial value (IV) during an initial synchronization phase (steps ST4-ST8) and a measured value (MV) during a measurement-based synchronization phase (ST11-ST13). A control circuit (central processing unit CPU in combination with the interface circuit IFC) carries out a calibration step (calibration flag FC not set: ST1, ST2, ST3B, ST4-ST9, ST14) in which the initial value (IV) is a preprogrammed reset value (RV) and in which the measured value (MV) is stored as a calibration value (CV). The control circuit (CPU, IFC) applies the calibration value (CV) as the initial value (IV) in subsequent initial synchronization phases.

The aforementioned characteristics can be implemented in numerous different manners. In order to illustrate this, some alternatives are briefly indicated. The calibration value CV may be stored in a memory other than the data memory DMEM. For example, the interface circuit IFC may comprise a further register for internal storage of the calibration value CV. The multiplexers MUX1, MUX2, which are illustrated in FIG. 2, may be replaced by other circuits and/or suitable software in, for example, the program memory PMEM. Control functions in relation to the operations illustrated in FIGS. 3A and 3B, may substantially be carried out by the interface circuit IFC in an autonomous manner. Alternatively, these functions may substantially be carried out under the control of the central processing unit CPU. Although a set of multiphase oscillator signals OS is advantageous as explained hereinbefore, the oscillator circuit OSC may provide a simple oscillator signal if, for example, less precision is required or if higher frequency circuits are available.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

What is claimed is:

1. A data communication device comprising:
   an input circuit arranged to convert external data into internal data on the basis of a sampling signal;
   a synchronization circuit arranged to provide the sampling signal on the basis of an oscillator signal and a synchronization value that is representative of a number of cycles of the oscillator signal contained within a time interval for a unit of external data, the synchronization value being an initial value during an initial synchronization phase and a measured value during a measurement-based synchronization phase; and
   a control circuit arranged to carry out a calibration step in which the initial value is a preprogrammed reset value and in which the measured value is stored as a calibration value, the control circuit being arranged to apply the calibration value as the initial value for subsequent initial synchronization phases.

2. The data communication device as claimed in claim 1, wherein the input circuit is arranged to receive and transmit a bit-serial stream in accordance with a universal serial bus standard.

3. The data communication device as claimed in claim 1, wherein an oscillator circuit is arranged to provide a set of multiphase oscillator signals and wherein the synchronization circuit is arranged to select an oscillator signal therefrom on the basis of a fractional part in the measured value.

4. A method of manufacturing a data communication device as claimed in claim 1, the method comprising a finishing step in which the data communication device is caused to carry out the calibration step while applying external data to the data communication device.

5. A data processing system comprising a computer and a data communication device as claimed in claim 1, which is connectable to the computer.

6. A data processing system comprising a computer and a data communication device as claimed in claim 2, which is connectable to the computer, the computer being arranged to receive data from the data communication device and to transmit data to the communication device in accordance with the universal serial bus standard.

7. A method of data communication that employs a data communication device comprising:
   an input circuit arranged to convert external data into internal data on the basis of a sampling signal; and
   a synchronization circuit arranged to provide the sampling signal on the basis of an oscillator signal and a synchronization value that is representative of a number of cycles of the oscillator signal contained within a time interval for a unit of data in the received external signal;
   the method comprising:
   an initial synchronization step during which an initial value constitutes the synchronization value and during which a measured value is established on the basis of a count of cycles of the oscillator signal within a time interval for N units of data, N being an integer;
   a measurement-based synchronization step during which the measured value constitutes the synchronization value; and
   a calibration step in which the initial value is a preprogrammed reset value and in which the measured value is stored as a calibration value, the calibration value being applied as the initial value for subsequent initial synchronization steps.

8. A device comprising:
   a processor;
   a memory comprising software instructions for causing the processor to perform:
   an initial synchronization step during which an initial value constitutes a synchronization value and during which a measured value is established on a basis of a count of cycles of an oscillator signal within a time interval for N units of data, N being an integer;
   a measured synchronization step during which a measured value constitutes a synchronization value; and
   a calibration step in which the initial value is a preprogrammed reset value and in which the measured value is stored as a calibration value, the calibration value being applied as the initial value for subsequent initial synchronization steps.

* * * * *